Aug. 6, 1935.  H. R. SCHENCK, JR  2,010,564
MOTION PICTURE CAMERA
Original Filed Aug. 26, 1932
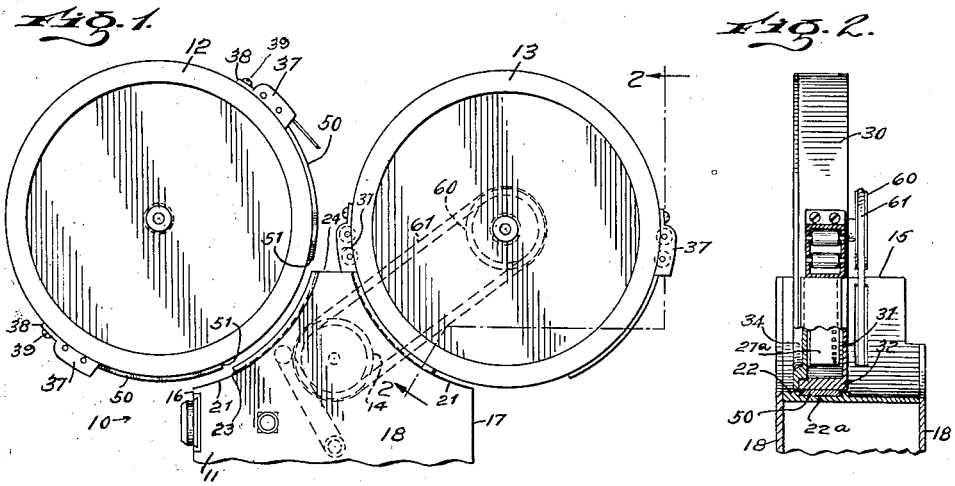
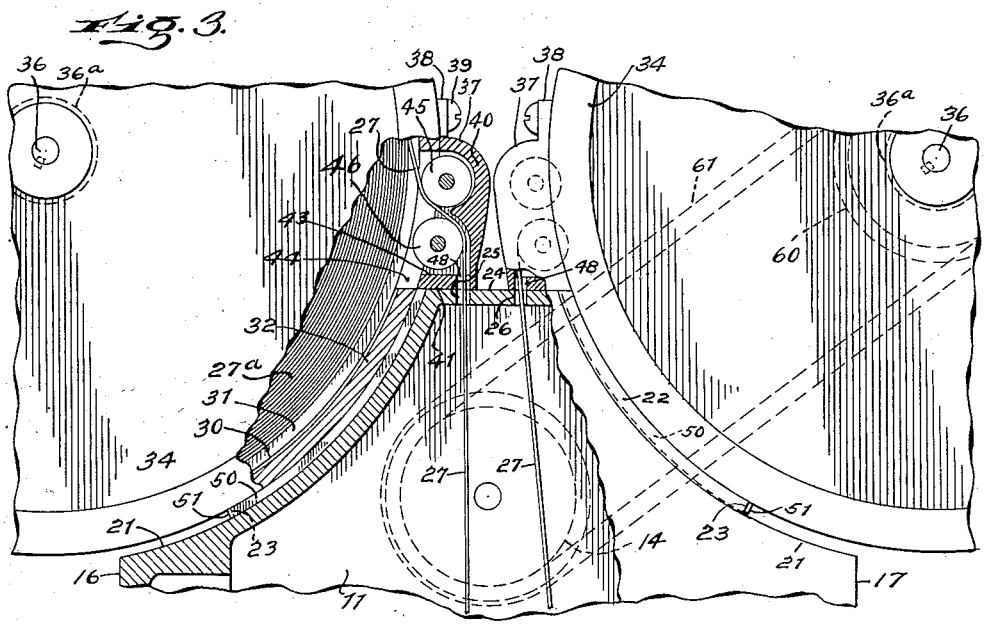
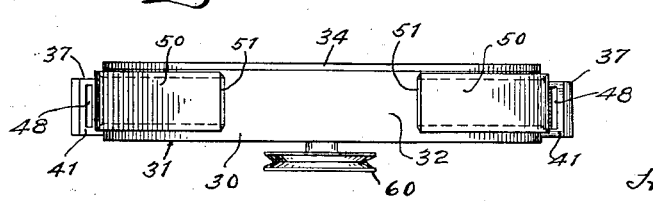
INVENTOR.
Harry R. Schenck, Jr.
BY
ATTORNEY Patented Aug. 6, 1935

2,010,564

UNITED STATES PATENT OFFICE 2,010,564

MOTION PICTURE CAMERA

Harry R. Schenck, Jr., Palisade, N. J.

Original application August 26, 1932, Serial No. 630,517. Divided and this application September 20, 1932, Serial No. 633,976

6 Claims. (Cl. 88—17)

This invention relates to cameras and the like articles, and is particularly directed to a camera for taking moving pictures.

An object of this invention is to provide in a camera of the character described, an improved camera casing and film holders or reels therefor, so constructed as to be readily mountable on and demountable from the casing, and interchangeable so that the holders either may be used as a film feeding reel or the rewind reel.

Another object of this invention is to provide compact, neat and rugged camera casing and reels of the character described, which shall be comparatively cheap to manufacture, comprise few and simple parts, which shall be easy to assemble and disassemble, smooth in operation and practical and efficient to a high degree in use.

Certain features shown, described and claimed in this application are shown and described but not claimed in my co-pending application, Ser. No. 630,517, filed August 26th, 1932, of which the present application is a division.

Other objects will in part be obvious and in part hereinafter pointed out.

The invention accordingly consists in the features of construction, combinations of elements, and arrangement of parts which will be exemplified in the construction hereinafter described, and of which the scope of application will be indicated in the following claims.

In the accompanying drawing, in which is shown one of the various possible embodiments of this invention, Fig. 1 is a partial, side elevational view of a camera embodying the invention with one of the reels shown in partially demounted position;

Fig. 2 is a cross-sectional view taken on line 2—2 of Fig. 1;

Fig. 3 is a fragmentary, enlarged, detail side elevational view of my improved camera with parts broken away to show the interior construction; and Fig. 4 is a bottom plan view of one of the reels.

Referring now in detail to the drawing, 10 designates a motion picture camera embodying the invention, comprising a casing 11 on which is mounted a reel 12 from which film is unwound, and a reel 13 for rewinding the film as said film is photographed.

The casing 11 and the mechanism for photographing the film may be similar to the structure shown and described in my aforementioned co-pending application, and includes means for rotating a pulley 14 within said casing, for the purpose hereinafter described.

The casing 11 comprises a bottom wall, a top wall 15, a front wall 16, a rear wall 17 and side walls 18. For supporting the reels 12 and 13, the top wall of the casing is provided with a pair of arcuate, symmetrically disposed, recessed wall portions 21 adjacent one of the side walls 18 of said casing, and extending to the front and rear wall thereof, respectively. Said arcuate walls are provided with raised portions 22 having curved slots or grooves 22a of dove-tailed transverse cross-section, said raised portions terminating as at 23, short of the front and rear walls 16 and 17 of the casing, and extending to the top of said casing. The angular extent of the arcuate grooves is preferably less than 60° each, for the purpose hereinafter stated. The flat top wall portion 24 of the casing which extends between the curved portions 22, is provided with a pair of symmetrically disposed, parallel slots 25 and 26 parallel to the front and rear walls of the casing and adapted to receive a strip of film 27 therethrough, said strip passing into the casing through the slot 25 from the reel 12 and passing out of the casing through the slot 26 for rewinding on the reel 13.

The reels 12 and 13 may be substantially similar in construction and are interchangeable, as will appear hereinafter, so that each reel may be mounted on each of the arcuate walls 22. The reel 12 comprises a cylindrical housing 30 having a circular flat wall portion 31 and a cylindrical wall portion 32 extending therefrom; and screwed to the free end of the cylindrical wall 32 is a disc or cover 34 to cover the open side of the casing. Said disc 34 and the wall 31 are formed with central, aligned bearing openings rotatably receiving an axial shaft 36 to which there is fixed a spindle or roller 36a provided with any suitable means for engaging the inner end of the strip of film 27 of the film roll 27a carried by said spindle. Attached to diametrically opposite points on the outer surface of the cylindrical wall 32 but extending in the same direction with respect to the diameter through the points of attachment, are a pair of similar members 37, each provided with an ear 38 receiving a screw 39, which attaches said member to said cylindrical wall. Each member 37, furthermore, comprises an enlarged portion 40 adapted to lie against and having the curvature of the outer surface of said cylindrical wall 32. As shown in Fig. 3 of the drawing, the bottom surface 41 of the member 37 at the right of the reel 12, contacts the upper surface of the wall portion 24 of the casing.

As will appear hereinafter, should the reel 12 be interchanged with the reel 13, the bottom surface of the member 37 at the left of the reel 12 will contact said wall portion 24. Each of said members 37 is hollow and is provided with an inner open or recessed side 43 registering with an opening 44 formed in the cylindrical wall 32. Said cylindrical wall is thus formed with a pair of said openings 44 registering with the inner open sides 43 of the two members 37 mounted thereon. The recess in each of the hollow members 37 is so shaped as to partially receive a pair of parallel rollers 45 and 46 rotatably mounted on a pair of transverse shafts suitably supported on a pair of opposite wall portions of said member 37. As shown in Fig. 3 of the drawing, the rollers 45 and 46 partially project into the opening 44, and the strip of film 27 passes from the roll 27a beneath the roller 45 and over the roller 46, said strip of film passing through an opening 48 in the bottom wall of said member 37 and through the opening 25 in the casing wall portion 24.

For mounting the reel 12 on the arcuate wall 22, the cylindrical wall 32 thereof is formed with a pair of spaced, arcuate flanges or tongues 50 of dove-tailed cross-section and each adapted to be slidably received within one of the arcuate grooves 22a. Each flange 50 is preferably substantially of the same angular extent as the grooved member 22. Said flanges 50, furthermore, begin at the bottom surfaces of the members 37 and extend toward each other. The inner ends 51 of said flanges 50 are preferably spaced from one another an angular distance equal to or somewhat greater than the angle of the grooved member 22. Thus for mounting the reel 12 on the casing, said reel is placed substantially in the position shown in Fig. 1 of the drawing, and moved sideways onto the arcuate wall 21 to bring the grooved portion 22 between the inner ends 51 of the flanges 50. Clockwise rotation of the reel 12 (looking at Fig. 1) will cause the flange 50 on the right of the reel, to be slidably received within the groove 22a. The reel may be rotated until the bottom surface 41 of the member 37 on the right of the reel contacts the upper surface 24 of the casing. Likewise, the reel 12 may be demounted from the casing by rotating the same in a counter-clockwise direction until the flange 50 is entirely removed from the grooved portion 22. The reel may then be moved axially or sideways to remove the same from the casing. It will be noted that the angle between the inner ends 51 of the flanges 50 must be at least equal to the angle of the grooved portion 22 to permit the reel to be axially moved out of engagement with said grooved portion after disengaging the flange 50 therefrom.

The reel 13, being constructed similarly to the reel 12, may be interchanged therewith, and the flanges 50 on both sides of each of the reels as well as the pair of members 37, will permit each roll to be mounted either on the right or the left of the casing and be used as a reel from which the film is unwound, or as a rewind reel.

Rotatably mounted on the central shaft 36 of the reel 13 and preferably readily detachable therefrom, is a pulley 60 in alignment with the pulley 14 within the casing, said pulleys being adapted to receive a belt 61 passing through suitable openings in the top wall of the casing. Thus the mechanism within the casing, not shown, but described in my said co-pending application, draws the strip of film 27 through the opening 25, and photographs the same; and rotation of the pulley 14 causes the spindle 36a of the reel 13 to be rotated for rewinding the film. Obviously the pulley 60 may be mounted on the shaft 36 of the reel 12, should said reel be used as the rewind reel. If desired both reels may be provided with pulleys.

It will thus be seen that there is provided a device in which the several objects of this invention are achieved, and which is well adapted to meet the conditions of practical use.

As various possible embodiments might be made of the above invention, and as various changes might be made in the embodiment set forth, it is to be understood that all matter herein set forth or shown in the accompanying drawing is to be interpreted as illustrative and not in a limiting sense.

Having thus described my invention, I claim as new and desire to secure by Letters Patent:

1. A motion picture camera comprising a casing formed with a substantially flat top wall portion and an arcuate wall portion extending to said flat top wall portion, a reel comprising a housing mounted on said arcuate wall portion, and a member on said housing contacting said top wall portion, a pair of rollers rotatably mounted within said member, and a roll of film mounted within said reel, said film extending between said rollers, said member and said top wall portion being formed with registering openings for receiving a strip of film from said roll extending into said camera casing.

2. A moving picture camera comprising a casing having an arcuate wall, a film reel comprising a housing, said housing and arcuate wall being formed with cooperating arcuate tongue and groove engaging means whereby said housing may be mounted on said arcuate wall upon rotating the former with respect to the latter for sliding the tongue into the groove, and a stop member detachably attached to said housing adapted to contact a portion of said casing to limit relative rotation of said housing with respect to said arcuate wall.

3. A camera comprising a casing having a top wall formed with a flat portion, and an arcuate portion extending from said flat portion to a side wall of said casing, said arcuate wall having a raised portion formed with a groove of dove-tailed cross-section, and a film reel roller mounted on said casing and comprising a housing having a cylindrical wall portion, a detachable stop member attached to said cylindrical wall portion, and a flange of dove-tailed cross-section on said cylindrical wall terminating at said stop member and received within said groove upon rotating said housing with respect to said casing to engage said flange within said groove, said stop member contacting the flat portion of the top wall of said casing.

4. In a camera, a casing having a flat wall portion and an arcuate wall portion extending from said flat wall portion, said arcuate wall portion being formed with a raised portion formed with an arcuate groove of dove-tailed transverse cross-section, and a film holder comprising a housing having a cylindrical wall formed with a pair of spaced arcuate flanges of dove-tailed cross-section, each adapted to be received in said arcuate grooves, and the inner ends of said flanges being spaced by an angle at least as great as the angular extent of the grooved portion of the casing.

5. In a camera, a casing having a flat wall portion and an arcuate wall portion extending from said flat wall portion, said arcuate wall portion being formed with a raised portion formed with an arcuate groove of dove-tailed transverse cross-section, and a film holder comprising a housing having a cylindrical wall formed with a pair of spaced arcuate flanges of dove-tailed cross-section, each adapted to be received in said arcuate grooves, the inner ends of said flanges being spaced by an angle at least as great as the angular extent of the grooved portion of the casing, and a pair of stop members detachably attached to the cylindrical wall of said housing at the outer ends of said arcuate flanges.

6. A motion picture camera comprising a casing formed with an arcuate wall portion and a flat wall portion adjacent said first portion, a film holder comprising a housing formed with a cylindrical wall portion engaging said arcuate wall portion, said cylindrical portion being formed with an opening, a stop member attached to said cylindrical wall and contacting said flat wall portions, and having the inner side thereof recessed, said recess registering with said opening, a pair of spaced, parallel rollers mounted within the recess of said member for receiving the strip of film from a roll mounted within the holder, said member being provided with an opening to permit the strip of film to pass therefrom, and said flat wall portion having an opening registering with said last opening to permit the strip of film to pass from said member into the casing.

HARRY R. SCHENCK, Jr.